July 5, 1932.   A. S. CATAUDELLA   1,866,248
BRAKE BAND ADJUSTING MEANS
Filed April 2, 1930
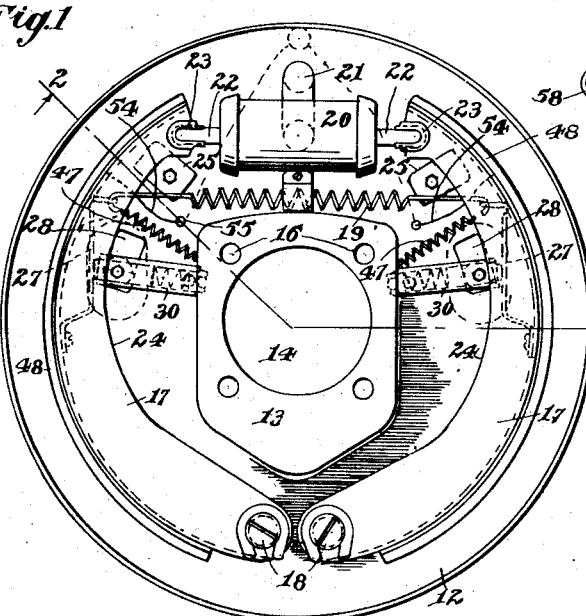
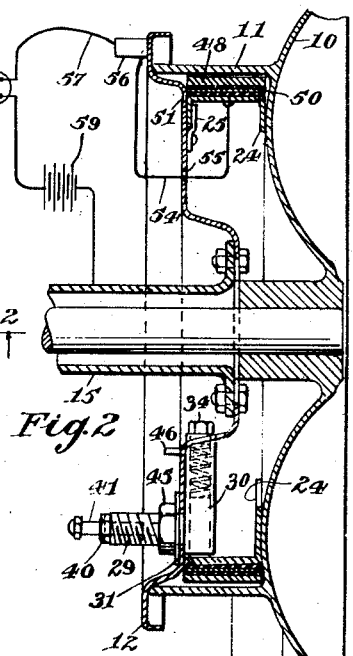
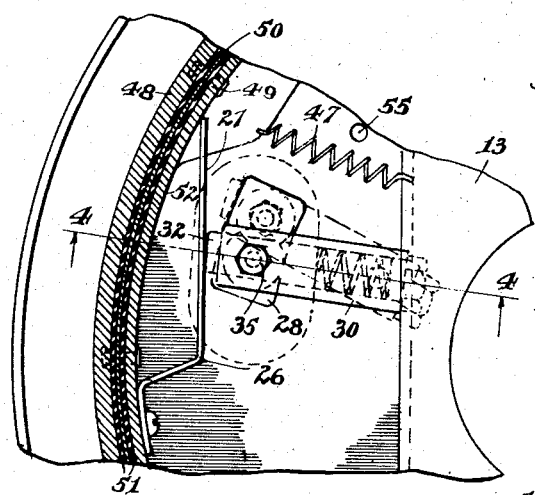
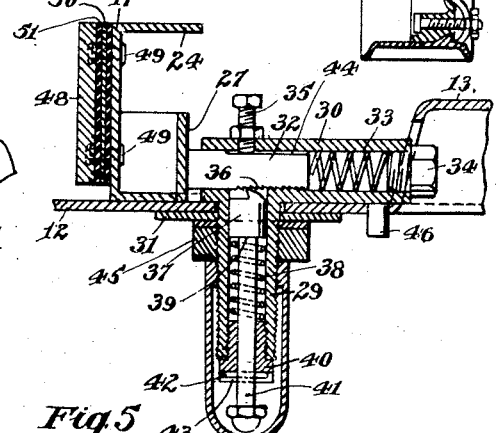
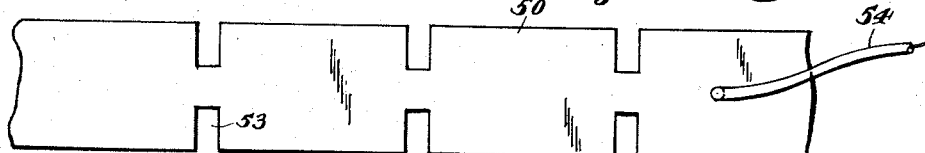
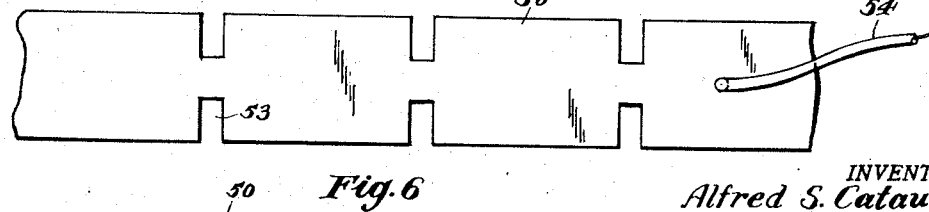
INVENTOR.
Alfred S. Cataudella
BY
Chamberlain & Newman
ATTORNEYS.

Patented July 5, 1932

1,866,248

UNITED STATES PATENT OFFICE

ALFRED S. CATAUDELLA, OF BRIDGEPORT, CONNECTICUT

BRAKE BAND ADJUSTING MEANS

Application filed April 2, 1930. Serial No. 441,002.

This invention relates to new and useful improvements in automobile brakes of the class adapted to be hydraulically operated and of the type employed on cars equipped with four-wheel brakes.

The object of the invention is to provide means for automatically taking up the wear on the brake bands of brakes of this class so that the same may be promptly and effectively operated and so as to avoid the necessity of frequent adjustment of the foot pedal for the brake, as is now necessary to do, with the wearing down of the brake bands.

My improvement further includes means for manually adjusting the brake when first applied to the car and in a manner which will insure a like adjustment of each of the four brakes so that all will take hold simultaneously, and so that when once set in this way, they will all thereafter automatically and similarly adjust themselves with the wearing away of the brake bands.

With these and other objects in view, the invention resides and consists in the construction and novel combination and arrangement of parts hereinafter more fully described, illustrated in the accompanying drawing, and pointed out in the claims hereto appended, it being understood that various changes in the form, proportion, size, and minor details of construction within the scope of the claims may be resorted to without departure from the spirit, or sacrificing any of the advantages of the invention.

Similar characters of reference denote like or corresponding parts throughout the several figures of the accompanying drawing forming a part of this specification and upon which—

Fig. 1 shows a front elevation of a fixed brake shell member of a modern type of hydraulic brake having two of my improved automatic adjusting devices applied thereto;

Fig. 2 is a horizontal cross section taken on line 2—2 of Fig. 1 through the said fixed brake shell and the rotatable wheel and drum;

Fig. 3 is an enlarged sectional elevational view of the automatic brake band adjusting means shown at the left in Fig. 1;

Fig. 4 shows a central vertical cross section taken on line 4—4 of Fig. 3 through the said adjusting means, the fixed brake drum and movable brake band and shoe to which it is attached;

Fig. 5 shows a detached plan view of the insulated copper plate secured between the brake shoe and brake lining, with an electrical alarm wire attached thereto; and Fig. 6 is a longitudinal section through the insulated copper plate and insulating covering shown in Fig. 5.

Referring in detail to the characters of reference marked upon the drawing, 10 represents a portion of a disk wheel; and 11 the cylindrical brake drum forming an integral part of the wheel and adapted to be rotated therewith, and which may be of the usual or any preferred construction. 12 represents a fixed brake shoe member having a stamped-up recessed portion 13 in which is provided a central hole 14 to accommodate an axle and axle housing 15, and is further provided with screw holes 16 whereby the shell may be secured to the end of axle housing and thus form a fixed member of the brake with respect to which the before mentioned wheel and drum rotate.

One end portion of each of a pair of semi-circular shaped shoes 17 are hingedly supported to studs 18 secured to brake shell 12 while the other or upper ends are adapted to be expanded by hydraulic means against the action of a spring 19, the opposite ends of which are attached to the respective shoes. said spring obviously serving to draw the brake shoes inward away from the brake drum 11.

20 represents a hydraulic cylinder that is adapted to be supplied with hydraulic liquid through any suitable pipe connection, as for instance 21 as shown. The pistons within the cylinder are each provided with central aligned stems 22 the outer ends of which are seated in yokes 23 that in turn are carried in recesses of the parallel spaced-apart flange portions 24 of the shoes. The hydraulic cylinder 20 and its operative connections with the shoes obviously serve to move the same upon the pivots 18 and thereby expand their brake linings against the brake drum and against the action of the before mentioned spring 19. The mechanism thus far described is substantially in accord with present commercial manufacturing practice and it is to the foregoing that I have applied my invention as an improvement thereto.

From the drawing it will be seen that the shoes each have side flanges 24, to the innermost ones of each of which, as shown in Fig. 1, I have applied a guide plate 25 that is secured to the shell in a way to allow ample free radial movement of the shoe, but to hold it against sidewise movement thus better to prevent rattling of the brakes. I have also attached a contact member 26 to the inner circular wall of the shoe, that includes a flat surface 27 that is disposed in tangential relation to the axis of the wheel rotatably mounted upon the shell, and positioned it for engagement with the automatic adjusting means which I will next describe. In this connection it may be borne in mind that the two brake shoes, their attached linings, signalling means and take-up device are alike in both instances; therefore, I will need to describe but one of these in detail.

28 represents elongated radially disposed openings in the web of the shell to receive a depending portion 29 of the take-up device 30. An elongated washer 31 is used on the outside of this opening to cover the same, though it is adapted to be moved along with the stem 29 for the adjustment of the part 30, as will later be referred to. The member 30 is of an elongated form, and aside from the depending portion 29 that freely passes through the opening 28. A plunger 32 is slidably mounted in one end portion of the bore of the member 30, while a spring 33 is positioned in the other end portion intermediate of the end of said plunger and a plug 34 which closes one end of the cylinder. This plunger is provided with a longitudinal groove 44 to receive the end of a set-screw 35 that serves to retain the plunger in alignment. The underside of this plunger is provided with a series of teeth 36 to form a ratchet that is normally engaged by a pawl 37 slidably positioned in the bore of the extension 29 and held in engagement with said ratchet by spring 38 positioned between the shoulder 39 of said pawl and a plug 40 threadably attached to the extension.

The pawl is provided with a depending stem 41 that projects from the end of the extension and includes a head whereby it may be engaged and manipulated as in the disengagement of its tooth from the rack against the action of the spring 38, and whereby the pawl and its shank may be turned and its stop pin 42, which is normally seated in a transverse pocket 43 in the nut 40, swung around upon the flat surface 44ª of the nut in a way to hold the pawl out of engagement with the rack. In this respect it will be seen that the teeth of the ratchet are sharply under-cut and that the tooth of the pawl is inclined to fit in under the teeth of the rack. This permits the plunger to automatically follow up the wear of the brake lining, and the tooth of the plunger to settle back into the tooth of the pawl, so that the plunger will have a limited yieldable movement with respect to the brake shoe.

The cylindrical body portion 30 is adapted to be secured to the shell by a nut 45 mounted upon the peripheral threaded portion of the depending member 29, said nut when tightened being seated against the plate 31 before mentioned. In addition to this means of clamping the member 30 to the shell, I also provide a pivotal stud 46 that is carried by the member 30 and extends down through a hole in the shell so that the member may be swung upon the pivot 46 when the nut is released. This loosening up of the parts is desirable in the attachment of new brake linings, when it is necessary to swing the brake shoes clear of the brake drum, and for the proper adjustment of the brake, as in the original assembling, or when relining the brakes. An additional short spring 47 has been applied as between the shoe and the recessed portion 13, as a safety means for holding the shoes free of the drum in addition to the before mentioned spring 19.

With the parts in the position shown in the several figures of the drawing, it will be seen that the plunger 32 which is seated against the face of the flat surface 27 of the brake shoe serves to hold the same in position to engage the linings of the shoe with the brake drum, and that the said plunger, by reason of the spring pressure behind it, is subjected to very slight longitudinal movement with each braking and releasing operation of the shoe, said braking operation being effected through the hydraulic means, whereas release of the brake shoes is assured by the springs 19 and 47 when the hydraulic pressure is released.

It will further be apparent that as the brake lining becomes worn, it is naturally permitted to move outward slightly further and when this movement becomes sufficient, the automatic pawl which engages the tooth or ratchet side of the plunger will drop into an adjacent notch so as to slightly extend the normal position of the plunger and form a new normal resting position for the brake shoe, which would be in closer proximity to the drum, thus requiring less movement of the shoe in the foot brake operations.

If a new lining is to be put in, the pawl is withdrawn against the action of its spring 38 whereupon the pawl may be disengaged and its casing 30 swung upon its pivot 46, to one side, see dotted lines Fig. 3, which releases the brake shoe and allows the parts to be disassembled, new linings applied, and again reassembled, with the plunger in position against the flat surface 27 of the brake shoe.

The brake shoes, as is customary in this style of brakes, include outer finished cylindrical surfaces to which brake linings 48 are secured as by means of rivets 49 and are thus adapted for engagement with the inner cylindrical surface of the brake drum, through the application of hydraulic pressure which causes the operation of the cylinder and expansion of the shoes against the inner wall of the brake drum.

In this connection I provide a signalling device which consists, in part, of copper strips 50 of suitable shape and proportion, that are covered with an insulating material 51, and place between the brake lining and the cylindrical wall 52 of the shoes, suitable openings 50 being provided in the insulative covered strips to accommodate the rivets employed for securing the lining and strip to the shoe. There is one of these strips employed upon each shoe, and a wire 54 serves to connect each of these strips through holes 55 in the shell, with a binding post 56 secured to the face of the shell and from which a single wire 57 may be carried up to a light 58 and then to the battery 59, and then grounded on the chassis.

From the construction and line of electric connection described, it will be seen that with the use of the brake the lining will necessarily become worn and that continued use will cause it to wear through so that the drum which has cut through the lining will wear away the insulation on the copper strip, thereby exposing the same to direct contact with the drum, thus closing the circuit in a way to display the signal referred to and thus inform the driver of the dangerous condition of the brake. It will be obvious that where four-wheel brakes are employed the wires 57 from the several pairs of brake shoes may be brought together in a suitable manner and from there connected by a single wire to the lamp, etc. in substantially the manner shown in Fig. 2.

Having thus described my invention, what I claim and desire to secure by Letters Patent is:—

1. In a brake of the class described, the combination of a rotatable brake drum, a fixed shell therefor, a brake shoe hingedly supported upon the shell, a brake lining mounted upon the shoe, means for operating the shoe, an automatic take-up carried upon the shell and including a body member hingedly attached to the shell, means for securing the body in various adjusted positions, a movable plunger carried therein adapted to engage the shoe, and means for normally forcing the plunger forward in engagement with the shoe to take up wear.

2. In a brake of the class described, the combination of a rotatable brake drum, a fixed shell therefor, a brake shoe hingedly supported upon the shell, a spring for normally holding the shoe out of engagement with the drum, means for operating the shoe against the action of the spring, an automatic take-up carried upon the shell, means for adjusting the take-up upon the shell and with respect to the drum, said take-up including a spring actuated plunger to retain the shoe in loose engagement with the drum, and means for holding the plunger in such engagement.

3. In a brake of the class described, the combination of a rotatable brake drum, a fixed shell therefor, a brake shoe hingedly supported upon the shell, a brake lining mounted upon the shoe, means for automatically taking up the wear on the shoe which comprises a member for engaging the shoe, a spring for moving said member into engagement with said shoe, and means for holding said member in positions obtained through the operation of the spring.

4. In a brake of the class described, the combination of a rotatable brake drum, a fixed shell therefor, a brake shoe hingedly supported upon the shell, a brake lining mounted upon the shoe, means for operating the shoe, an automatic take-up carried upon the shell and including a hollow body member having a hollow arm projected therefrom, a movable plunger including a ratchet carried within the body adapted to engage the shoe, a spring within said body for normally forcing the plunger in engagement with the shoe to take up wear, a spring actuated pawl mounted within the extension of the body for engagement with the ratchet to hold the plunger in engagement with the brake shoe.

Signed at Bridgeport, in the county of Fairfield and State of Connecticut, this 1st day of April, A. D. 1930.

ALFRED S. CATAUDELLA.